(12) United States Patent
Ikonen (10) Patent No.: US 11,268,470 B2
(45) Date of Patent: Mar. 8, 2022

(54) FUEL CONTROL

(71) Applicant: HUSQVARNA AB, Huskvarna (SE)

(72) Inventor: Johan Ikonen, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 17/052,663

(22) PCT Filed: Apr. 30, 2019

(86) PCT No.: PCT/SE2019/050387
§ 371 (c)(1),
(2) Date: Nov. 3, 2020

(87) PCT Pub. No.: WO2019/216806
PCT Pub. Date: Nov. 14, 2019

(65) Prior Publication Data
US 2021/0231073 A1    Jul. 29, 2021

(30) Foreign Application Priority Data
May 7, 2018    (SE) .................................... 1850536-2

(51) Int. Cl.
*F02D 41/16* (2006.01)
*F02D 31/00* (2006.01)
*F02D 41/08* (2006.01)

(52) U.S. Cl.
CPC ........... *F02D 41/16* (2013.01); *F02D 31/008* (2013.01); *F02D 41/08* (2013.01)

(58) Field of Classification Search
CPC ......... F02D 41/16; F02D 41/08; F02D 31/008
See application file for complete search history.

(56) References Cited

U.S. PATENT DOCUMENTS

| 4,360,481 A * | 11/1982 | Kaufman ................. F02M 3/10 |
| | | 137/468 |
| 6,848,417 B2 | 2/2005 | Surnilla et al. |
| 8,074,623 B2 | 12/2011 | Bo et al. |

(Continued)

FOREIGN PATENT DOCUMENTS

| DE | 102014210849 A1 | 12/2015 |
| JP | 2007192049 A | 8/2007 |

(Continued)

OTHER PUBLICATIONS

International Search Report and Written Opinion for International Application No. PCT/SE2019/050387 dated Jun. 19, 2019.

(Continued)

*Primary Examiner* — Joseph J Dallo
(74) *Attorney, Agent, or Firm* — Burr & Forman LLP (57) ABSTRACT

A method in a combustion engine 100 for determining a desired fuel setting λ+. The method comprises configuring a fuel setting λ, determining a combustion engine parameter β in dependence of the configured fuel setting λ, wherein the combustion engine parameter is related to the fuel setting by a convex function relationship, and updating the fuel setting λ towards the desired fuel setting λ+, based on the determined combustion engine parameter β and on the convex function relationship between the fuel setting λ and the combustion engine parameter β.

20 Claims, 6 Drawing Sheets

(56) References Cited

U.S. PATENT DOCUMENTS

| | | |
|---|---|---|
| 8,914,219 B2 | 12/2014 | Neubauer et al. |
| 9,062,621 B2 | 6/2015 | Yamashita et al. |
| 9,849,880 B2 * | 12/2017 | D'Amato ............... B60W 10/04 |
| 10,124,784 B2 * | 11/2018 | D'Amato ........... B60W 50/0097 |
| 2008/0041338 A1 | 2/2008 | Nickel et al. |
| 2011/0000462 A1 | 1/2011 | Ostojic et al. |
| 2011/0180045 A1 * | 7/2011 | Hosokawa ............. F02P 5/1516 |
| | | 123/48 R |
| 2013/0112170 A1 | 5/2013 | Yamashita et al. |

FOREIGN PATENT DOCUMENTS

| | | |
|---|---|---|
| SE | 201551274 A1 | 10/2015 |
| SE | 201750470 A1 | 4/2017 |
| WO | 2017015565 A1 | 1/2017 |

OTHER PUBLICATIONS

Swedish Office Action and Search Report for Swedish Application No. 1850536-2, dated Oct. 23, 2018.

* cited by examiner

FUEL CONTROL

TECHNICAL FIELD

This disclosure relates to determining a desired fuel setting for use with combustion engines, and in particular to idle fuel control for combustion engines.

BACKGROUND

A combustion engine uses a mixture of fuel, e.g. gasoline, and air for the combustion which drives the engine. The amount of fuel in relation to the amount of air in the mixture is referred to as a fuel setting. A rich fuel setting, or mixture, contains a relatively large quantity of fuel, whereas a lean fuel setting, or mixture, contains a smaller amount of fuel.

A desired fuel setting results in a fast combustion process with low emissions. The desired fuel setting varies according to different parameters, such as engine design, operating conditions, and fuel properties. Thus, the fuel setting is advantageously adapted to suit the current operating scenario.

The process of adapting the fuel setting to different operating parameters is herein referred to as fuel control, which is performed by a control unit such as a fuel controller.

A known fuel controller periodically extends a closing time of a fuel valve in order to make the fuel mixture leaner. The response from the engine in dependence of the extended closing time is then monitored; If the engine speed, in terms of, e.g., revolutions per minute (RPM) increases in dependence of the closing operation then the fuel controller updates the fuel setting to a more lean mixture, whereas if the engine speed decreases as a result of the extended dosing time, the fuel controller updates the fuel setting to a more rich mixture.

U.S. Pat. No. 8,074,623 B2 discusses a fuel controller that operates according to the principle of extending a dosing time of a fuel valve.

By periodically extending the closing time of the fuel valve, the engine may exhibit reduced acceleration performance during the extended closing time interval, which is a drawback.

SUMMARY

It is an object of the present disclosure to provide a control unit, a combustion engine, power tools, and methods which enable determining a desired fuel setting without reducing acceleration performance.

This object is obtained by a method in a combustion engine for determining a desired fuel setting. The method comprises configuring a fuel setting $\lambda$, and determining a combustion engine parameter $\beta$ in dependence of the configured fuel setting $\lambda$, wherein the combustion engine parameter $\beta$ is associated with an ignition timing value $\alpha$ of the combustion engine, and also updating S4 the fuel setting $\lambda$ towards the desired fuel setting $\lambda^+$, based on the determined combustion engine parameter $\beta$ and on a convex function relationship between the fuel setting $\lambda$ and the combustion engine parameter $\beta$.

Thus, the combustion engine disclosed herein does not rely solely on the known technique discussed above comprising periodically extending a closing time of a fuel valve in order to make the mixture more lean and monitoring a response of the engine. Consequently, the combustion engine, at least during operation in idle mode, is not associated with the above-mentioned drawback of reduced acceleration performance during the extended closing time interval.

Also, the disclosed technique allows for an improved optimization of the fuel setting. For instance, the fuel setting may be continuously or regularly optimized to account for changes in operating conditions.

According to aspects, the desired fuel setting is a desired fuel setting for an idle mode of the combustion engine. Thus, the idle mode fuel setting is improved compared to known techniques of determining fuel setting.

The disclosed technique is compatible with known techniques comprising periodically extending a closing time of a fuel valve. Thus, the disclosed technique may be used during, e.g., an idle mode of operation, while other techniques for determining fuel setting may be used during other modes of operation of the combustion engine.

A further disadvantage associated with periodically extending a closing time of the fuel valve is that an ignition controller comprised in the combustion engine will try to maintain a steady engine speed. By extending the closing time, this speed will change, and the ignition controller will try to counteract the change. Consequently, the ignition controller must be parameterized in order to allow for changes during the extended closing time, which is a drawback, since it limits the control bandwidth of the ignition controller. Since the disclosed methods do not rely solely on extended fuel valve closing times, the ignition controller can be designed without regard for such extended fuel valve closing times, which allows for a more efficient ignition timing control design.

According to aspects, the determining comprises evaluating a gradient $d/d\lambda$ of the combustion engine parameter $\beta$ with respect to the fuel setting $\lambda$. The updating then comprises updating the fuel setting $\lambda$ based on the gradient $d/d\lambda$ of the combustion engine parameter $\beta$. The gradient evaluation can be performed in a computationally efficient manner, e.g., by evaluating sign changes or differences. This way a computationally efficient method and control unit is obtained.

According to aspects, evaluating the gradient comprises evaluating a modified gradient to bias the desired fuel setting $\lambda^+$ from an optimal fuel setting $\lambda^*$. This is advantageous in that it, e.g., allows for increased acceleration performance starting from an idle mode of the engine, which can be obtained by biasing the fuel setting $\lambda$ from the optimal value $\lambda^*$ towards a slightly richer fuel setting $\lambda^+$.

According to aspects, configuring the fuel setting $\lambda$ comprises alternating between a high and a low fuel setting. The high fuel setting corresponds to a configured fuel setting with a positive bias and the low fuel setting corresponds to the configured fuel setting with a negative bias. This allows for an improved control using small changes in ignition timing which may occur when the current fuel setting value is close to the desired fuel setting value.

There are also disclosed herein control units, combustion engines, and power tools such as hand-held power tools, associated with the above-mentioned advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art.

Figure 1:
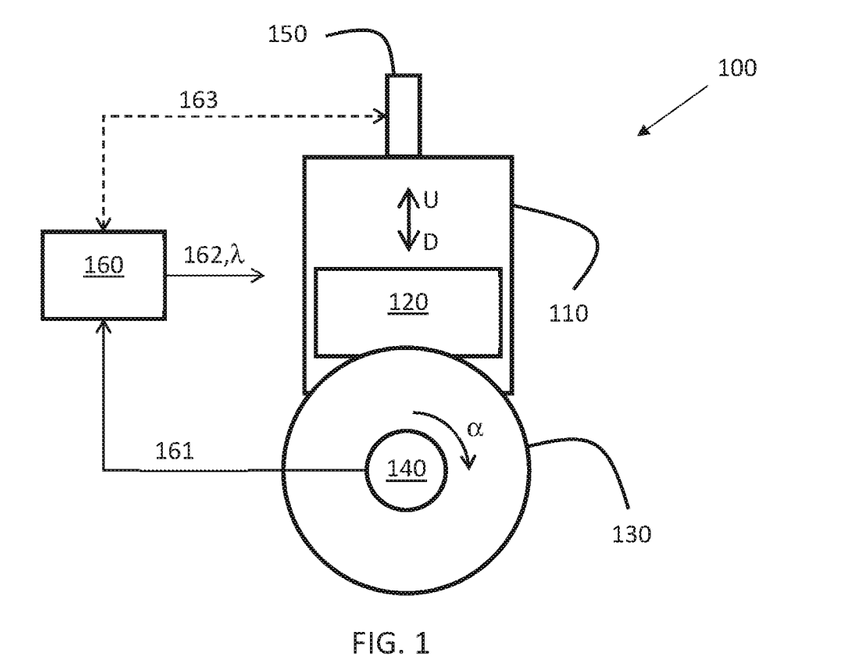
FIG. 1 schematically illustrates a combustion engine.

FIG. 1 schematically illustrates a combustion engine 100. A piston 120 is arranged to reciprocate in a combustion chamber 110 in an upwards U and in a downwards D direction. A fuel/air mixture having a composition decided by a fuel setting $\lambda$ is injected into the chamber 110 as the piston reciprocates in the upwards direction U. Just before the piston reaches its topmost position, often referred to as top dead center, the fuel/air mixture is ignited by an ignition device 150. The fuel/air mixture then burns, causing gas expansion, which forces the piston in the downwards direction D.

The linear motion of the piston 120 is transferred in a known manner to a circular motion of a crankshaft 140 arranged in a crankcase 130.

The ignition timing, i.e., the time instant when the fuel/air mixture is ignited by the ignition device 150, can be measured by an angle $\alpha$ of the crankshaft 140 at the time of ignition. The ignition timing is a combustion engine parameter.

The angle $\alpha$ can be measured in various ways and with various reference systems. A common measurement reference is the angle advanced before top dead center (BTDC), which refers to the number of degrees or radians the crankshaft has to rotate before the piston reaches its topmost position.

The ignition timing $\alpha$ depends, among other things, on the burn rate of the fuel/air mixture, i.e., on the fuel setting $\lambda$. In order to achieve a desired running characteristic of the engine, the ignition occurs at a larger angle BTDC for a slow burn rate, and at a smaller angle BTDC for a faster burn-rate. This is because a fuel/air mixture associated with slower burn-rate needs more time to achieve combustion pressure than a fuel/air mixture associated with faster burn-rate.

Figure 3:
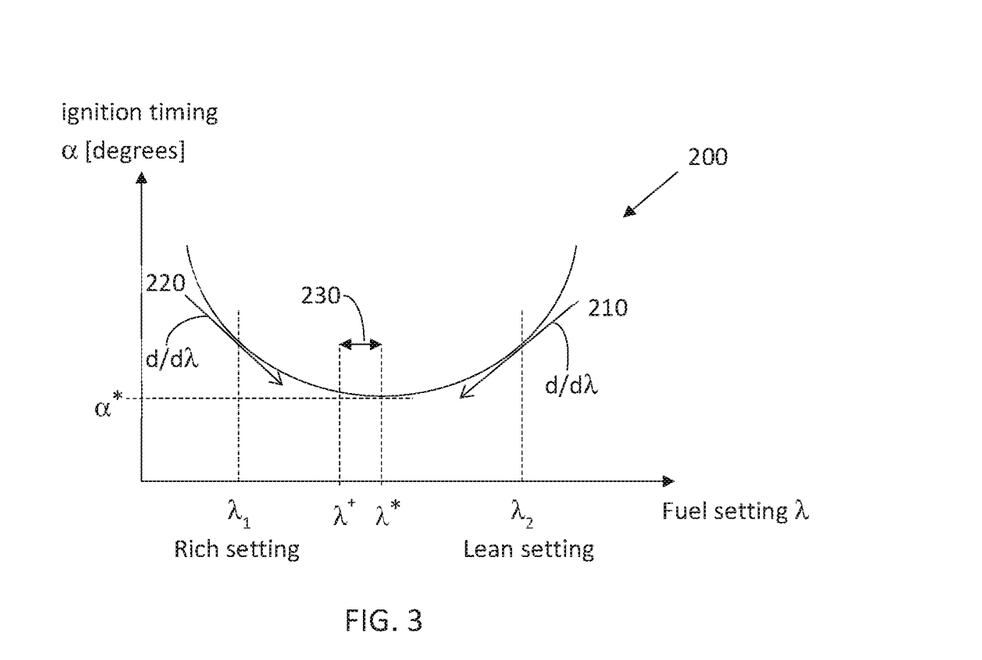
FIG. 3 is a graph showing ignition timing as function of fuel setting.

This effect is illustrated in FIG. 3, where ignition timing $\alpha$ in degrees is plotted vs. fuel setting $\lambda$. It can be seen that a rich setting, e.g., $\lambda_1$, results in an ignition timing value above a minimum value $\alpha^*$ degrees BTDC. A lean setting, e.g., $\lambda_2$, also results in an ignition timing value above minimum value $\alpha^*$ degrees BTDC. The curve 200 is a convex function and therefore has slopes, or derivatives 210, 220, towards the minimum ignition timing value $\alpha^*$.

A convex curve, or convex functional relationship, is a curve in the Euclidean plane which lies completely on one side of each and every one of its tangent lines 210, 230. The relationship between ignition timing and fuel setting is a convex relationship, i.e., the combustion engine ignition timing parameter is a convex function of fuel setting.

Figure 4:
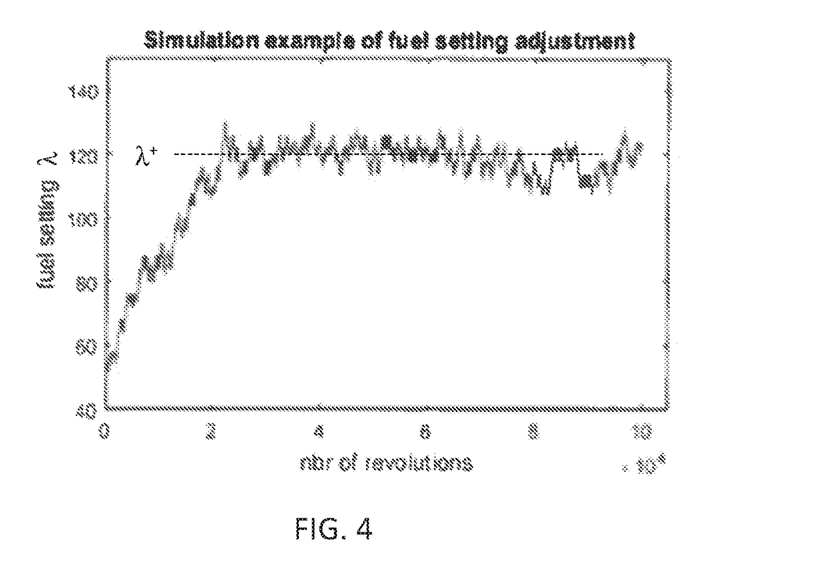
FIG. 4 is a graph showing an adaptation of a fuel setting.
Figure 5:
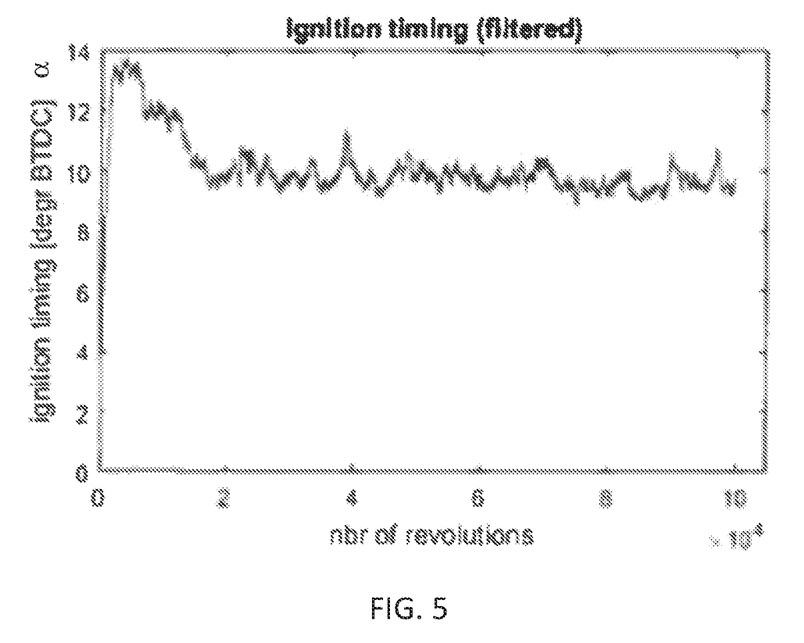
FIG. 5 is a graph showing ignition timing in dependence of updated fuel setting.

An operation example of the control unit 160 is illustrated in FIG. 4 and in FIG. 5, which two graphs illustrate measurement results from an experiment comprising the control unit 160 used for updating fuel setting in a combustion engine 100, 200. FIG. 4 is a graph showing fuel setting vs engine revolutions on a scale from 0 to 255, where 0 is a very rich fuel setting and 255 is a very lean fuel setting. It is noted that only values from 40 to 140 are represented in FIG. 4. The initial fuel setting at start is here set too rich at approximately 50.

FIG. 5 is a graph showing ignition timing $\alpha$ in degrees BTDC plotted vs engine revolutions. After a transient behavior, the ignition timing is initially high at about 14 degrees BTDC.

The control unit 160 monitors the ignition timing via the output port 161 and updates the fuel setting value on the input port 162 to reduce the ignition timing value. This can be seen in FIG. 4 which shows an increased fuel setting value $\lambda$ that eventually levels out at a desired value $\lambda^+$ of approximately 120. The corresponding ignition timing value $\alpha$ is reduced gradually to approximately 10 degrees, which is close to minimum for the exemplified scenario.

According to aspects, the control unit 160 implements different algorithms in order to arrive at the desired fuel setting $\lambda^+$. However, these algorithms all comprise configuring a fuel setting $\lambda$, determining an ignition timing value $\alpha$ or revolution speed variance Var[$\omega$] in dependence of the configured fuel setting $\lambda$, and updating the fuel setting $\lambda$ based on the determined ignition timing value $\alpha$ and/or revolution speed variance Var[$\omega$], towards the desired fuel setting $\lambda^+$.

Another combustion engine parameter which is affected by the fuel setting $\lambda$ is the variance of the combustion engine speed of rotation Var[$\omega$], i.e., revolution speed variance, or revspeed variance.

Herein, variance is the expectation of the squared deviation of the speed of rotation from its mean. Informally, variance measures how far a set of numbers are spread out from their average value. According to aspects, variance is construed as sample variance. According to further aspects, variance is construed as variance or spread determined over a limited time duration.

Figure 7:
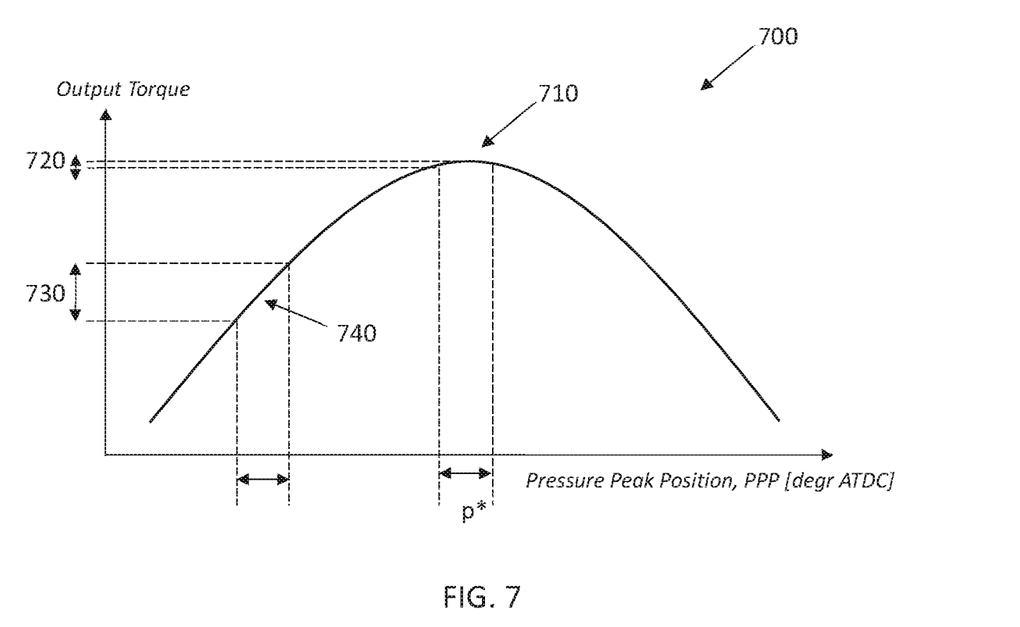
FIG. 7 is a graph showing output torque in dependence of pressure peak position

FIG. 7 illustrates output torque 700 as function of pressure peak position (PPP) in degrees after top dead center (ATDC). It is noted that the combustion engine output torque reaches a maximum value 710 at a given pressure peak position p*. This pressure peak position is, according to some aspects, for some engine designs, around 12-20 degrees ATDC. If the ignition control is igniting at a near optimal value, the combustion engine output torque is maximized 710. Notably, the variation in output torque 720 around the maximum value 710 is smaller than the variation in output torque 730 around a non-optimal pressure peak position value 740. Consequently, variations in ignition timing in a range of ignition timings separated from an optimal ignition timing value, which gives maximum torque, will generate a larger variation in revolution speed variance compared to variations in ignition timing in a range close to an optimal ignition timing.

A reason why this effect occurs is that the ignition timing control function constantly tries to compensate for a non-optimal fuel setting to maintain a correct revolution speed.

Figure 8:
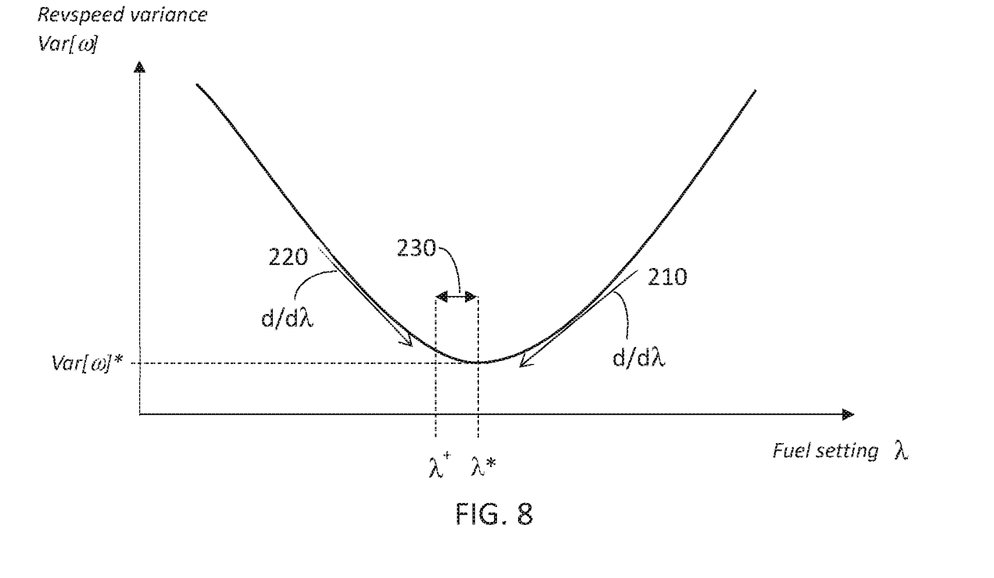
FIG. 8 is a graph showing revolution speed variance in dependence of fuel setting FIG. 9 schematically illustrates a control unit for a combustion engine.

As illustrated in FIG. 8, the relationship between revolution speed variance, revspeed variance, and fuel setting is a convex relationship, i.e., revspeed variance is a convex function of fuel setting. The similarity between the curves in FIG. 3 and in FIG. 8 are noted. An optimization routine which minimizes a combustion engine parameter such as ignition timing in FIG. 3 or revspeed variance in FIG. 8 by varying fuel setting will generate a desired fuel setting.

As will be discussed in more detail below, the optimum fuel setting $\lambda^*$, i.e., the fuel setting corresponding to minimum ignition timing $\alpha^*$ or minimum revolution speed variance $Var[\omega]$, is not always the desired fuel setting. For instance, according to some aspects, an increased acceleration performance starting from an idle mode of the engine 100, 200, can be obtained by biasing 230 the fuel setting $\lambda$ from the optimal value $\lambda^*$ towards a slightly richer fuel setting $\lambda^+$. This biasing is illustrated in FIG. 3 and in FIG. 8.

Figure 2:
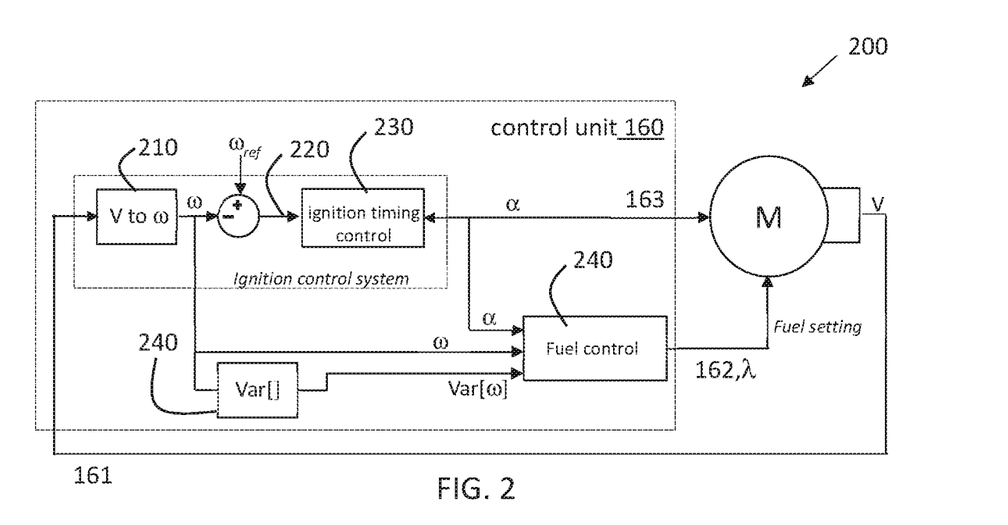
FIG. 2 shows an example of a combustion engine control system.

FIG. 1 and FIG. 2 shows a control unit 160. The control unit 160 is arranged to control the fuel setting $\lambda$ of the combustion engine 100, 200 by determining and outputting a fuel setting value on an input port 162 of the combustion engine 100, 200. The fuel setting value then controls, e.g., the operation of a fuel valve, not shown in FIG. 1 or FIG. 2, used to achieve the configured fuel/air mixture levels in a known manner.

According to aspects, the control unit 160 is arranged to receive ignition timing information 163 and to control the operation of the ignition device 150 to achieve a desired engine speed, usually measured in revolutions per minute (RPM). According to such aspects, the control unit 160 provides an ignition timing controller function 230 in addition to the fuel setting control, as exemplified in FIG. 2. It is appreciated that such an ignition timing controller function works against, i.e., counteracts, engine speed changes in idle mode. Thus, the ignition controller suppresses engine speed changes due to, e.g., a fuel valve closing event. The ignition controller function and the fuel control function may advantageously be designed together in order to optimize engine combustion and overall performance.

The control unit 160 is arranged to obtain an ignition timing value $\alpha$ in dependence of the configured fuel setting $\lambda$.

According to one example embodiment, the ignition timing value $\alpha$ is obtained, e.g., from a sensor arranged in connection to the crankshaft 140.

According to another example embodiment, the ignition timing value $\alpha$ is obtained by an ignition timing control unit 230 comprised in the control unit 160. Such an example is illustrated in FIG. 2. Here, a voltage pulse V is generated from the rotation of a flywheel and a magnet arrangement in a known manner. Consecutive voltage pulses V are converted 210 to revolutions per minute, i.e., revolution speed $\omega$ of the engine 100, 200, by the control unit 160. This revolution speed $\omega$ is compared to a reference value $\omega_{ref}$, and the difference 220 is used for ignition timing control by the ignition timing control unit 230, as illustrated in FIG. 2.

According to a further example embodiment, the ignition timing control unit 230 and the fuel control unit 240 illustrated in FIG. 2 are implemented as separate control units. It is appreciated that such functions as ignition timing and fuel control can be implemented in separate control units or in the same control unit without affecting the function of the combustion engine or the fuel setting.

As will be discussed below in detail, the control unit 160 is arranged to update the fuel setting $\lambda$ based on the determined ignition timing value $\alpha$ and/or based on the revolution speed variance $Var[\omega]$, and on the convex relationship between ignition timing and fuel setting or between revolution speed variance and fuel setting, towards a desired fuel setting $\lambda^+$.

The update can be done periodically in order to follow changes in operating conditions. The update can also be iterative, where the desired fuel setting is reached after a number of iterations involving changing the current fuel setting by a step size towards the desired fuel setting. The step size used can be either fixed or adaptive.

It is appreciated that fuel control, according to some aspects, can be based on additional input parameters other than the ignition timing value $\alpha$, such as revolution speed $\omega$.

Notably, the control unit 160 does not rely solely on the known technique discussed above comprising periodically extending a closing time of a fuel valve in order to make the mixture more lean and monitoring a response of the engine. Consequently, the combustion engine 100, 200, at least during operation in idle mode, is not associated with the above-mentioned drawback of reduced acceleration performance during the extended closing time interval.

A further disadvantage associated with periodically extending a closing time of the fuel valve is that the ignition controller tries to maintain a steady engine speed. By extending the closing time, this speed will change, and the ignition controller will try to counteract the change. Consequently, the ignition controller must be parameterized in order to allow for changes during the extended closing time, which is a drawback, since it limits the control bandwidth of the ignition controller. Since the control unit 160 does not rely solely on the use of extended fuel valve closing times, the ignition controller can be designed without regard for such extended fuel valve closing times, which allows for a more efficient ignition timing control design.

Instead of periodically extending a closing time of a fuel valve, the control unit 160 exploits the property that the burn rate is dependent on the fuel setting for fuel control. Since the burn rate is fastest when the fuel setting is optimal, assuming a functional ignition device 150 which suitably controls the ignition timing, the ignition timing will be at its lowest value BTDC when the fuel/air mixture is optimal. Regardless of whether the mixture is too lean or too rich, the ignition controller is forced to increase ignition timing to maintain the desired engine speed. The lowest ignition timing is therefore achieved at optimal fuel setting.

Consequently, by monitoring the ignition timing value $\alpha$, and updating the fuel setting such that the ignition timing is at its minimum value, an optimal fuel setting $\lambda^*$ can be achieved.

As discussed above in connection to FIGS. 7 and 8, revolution speed variance $Var[\omega]$ is also a convex function of fuel setting. Consequently, by monitoring the revolution speed variance $Var[\omega]$ and updating the fuel setting such that the revolution speed variance is at its minimum value, an optimal fuel setting $\lambda^*$ can be achieved.

Since the optimal fuel setting depends on various factors, e.g., engine design, operating conditions, and the properties of the fuel, air, and burned gas mixture, the fuel setting is advantageously updated on a regular basis to account for variations in the mentioned factors.

Figure 6:
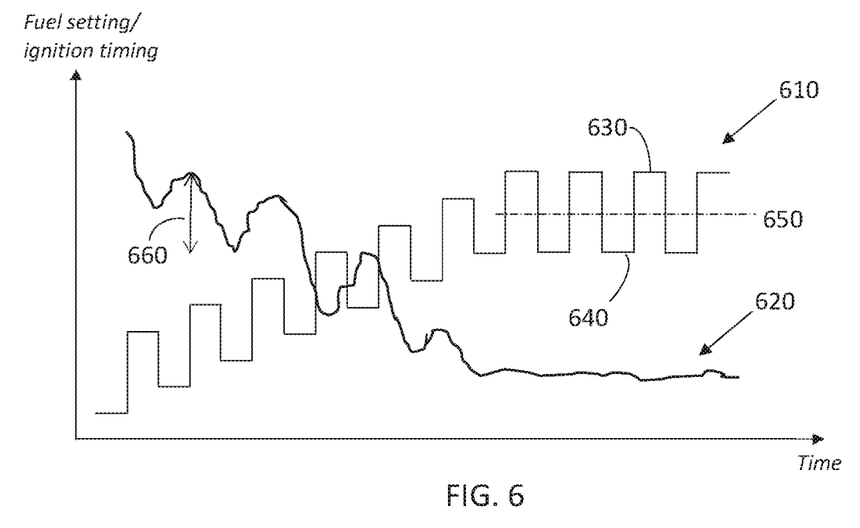
FIG. 6 is a graph showing ignition timing and fuel setting evolving over time.

FIG. 6 is a graph showing ignition timing 620 and fuel setting 610 evolving over time, according to an operating example. Here, the fuel setting $\lambda$ starts at a rich setting, i.e., similar to the example discussed in connection to FIG. 4, and the ignition timing starts at a relatively high value in terms of degrees BTDC.

It is appreciated that the changes in ignition timing for a near-optimal fuel setting are relatively small and can therefore be difficult to measure or detect. This can be inferred from the graph in FIG. 3 which was discussed above. To simplify the detection of ignition timing changes, the fuel setting is, according to aspects, alternated between a positively biased value and a negatively biased value centered around a nominal value 650. Due to the introduced bias, changes 660 in ignition timing are larger and therefore more easily measured. This can be seen from the ignition timing curve 620 which changes as the fuel setting is alternated. The nominal fuel setting can then be adjusted in the direction of the gradient as discussed above. At convergence, the nominal fuel setting approaches $\lambda^+$ or $\lambda^*$ depending on preference.

In other words, according to some aspects, configuring a fuel setting $\lambda$ comprises alternating S13 between a high 630 and a low 640 fuel setting. The high fuel setting corresponds to a nominal fuel setting with a positive bias, and the low fuel setting corresponds to the nominal fuel setting with a negative bias.

According to some aspects, the updating comprises decreasing the nominal fuel setting, if the low fuel setting corresponded to a reduced ignition timing value compared to the high fuel setting and increasing the nominal fuel setting, if the high fuel setting corresponded to a reduced ignition timing value compared to the low fuel setting. It is appreciated that this updating method is an example of an updating method which updates the fuel setting towards the desired fuel setting $\lambda^+$ discussed above, based on the determined ignition timing value $\alpha$, and on a convex relationship between the fuel setting $\lambda$ and the ignition timing value $\alpha$.

Figure 9:
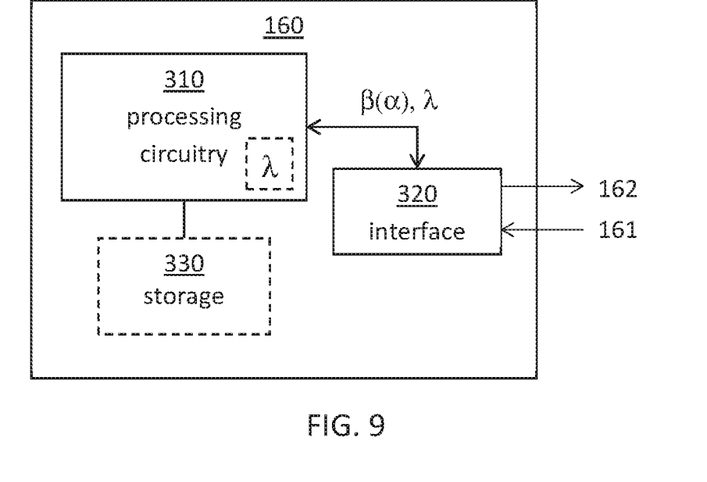

FIG. 9 schematically illustrates a control unit 160 for a combustion engine 100, 200. The combustion engine is arranged to output an ignition timing value $\alpha$ on an output port 161 and to receive a fuel setting $\lambda$ on an input port 162. The control unit 160 comprises processing circuitry 310 and an interface module 320.

The methods and techniques discussed above can be performed by the control unit 160 illustrated in FIG. 9.

For instance, the processing circuitry is arranged to configure a fuel setting $\lambda$ and to output the fuel setting via the interface module 320 to the input port 162. The processing circuitry 310 is arranged to receive an ignition timing value $\alpha$ in dependence of the configured fuel setting $\lambda$ via the interface module 320 from the output port 161. The processing circuitry 310 is also arranged to update the fuel setting $\lambda$ based on the determined ignition timing value $\alpha$, towards a desired fuel setting $\lambda^+$.

The processing circuitry 310 is provided using any combination of one or more of a suitable central processing unit CPU, multiprocessor, microcontroller, digital signal processor DSP, etc., capable of executing software instructions stored in a computer program product, e.g. in the form of a storage medium 330. The processing circuitry 310 may further be provided as at least one application specific integrated circuit ASIC, or field programmable gate array FPGA.

Particularly, the processing circuitry 310 is configured to cause the control unit 160 to perform a set of operations, or steps. For example, the storage medium 330 may store the set of operations, and the processing circuitry 310 may be configured to retrieve the set of operations from the storage medium 330 to cause the control unit 160 to perform the set of operations. The set of operations may be provided as a set of executable instructions. Thus, the processing circuitry 310 is thereby arranged to execute methods as herein disclosed, such as the methods discussed below in connection to FIG. 10.

The storage medium 330 may also comprise persistent storage, which, for example, can be any single one or combination of magnetic memory, optical memory, solid state memory or even remotely mounted memory.

The control unit 160 further comprises an interface. 320 for communications with at least one external port. As such the interface 320 may comprise one or more transmitters and receivers, comprising analogue and digital components and a suitable number ports for wireline or wireless communication.

The processing circuitry 310 controls the general operation of the control unit 160 e.g. by sending data and control signals to the interface 320 and the storage medium 330, by receiving data and reports from the interface 320, and by retrieving data and instructions from the storage medium 330. Other components, as well as the related functionality, of the control unit 160 are omitted in order not to obscure the concepts presented herein.

Figure 10:
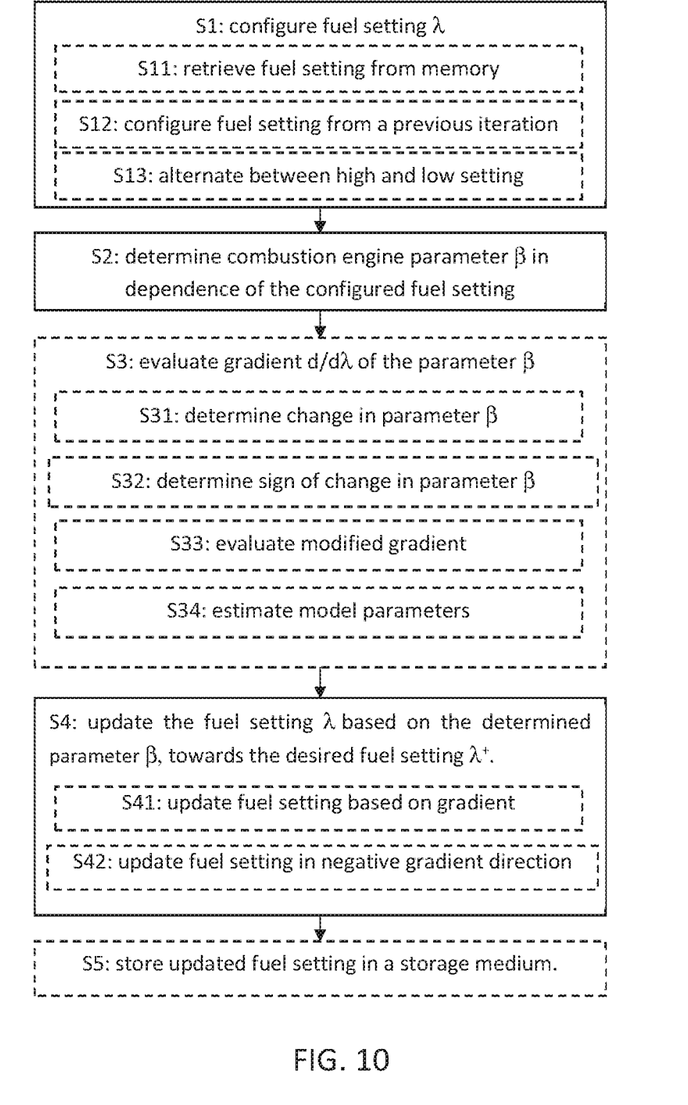
FIG. 10 is a flow chart showing methods.

FIG. 10 is a flow chart showing methods. The control unit 160 discussed above in connection to FIGS. 1-9 is, according to different aspects, arranged to perform the illustrated methods to control various operations in the combustion engine 100, 200. There is shown a method in a combustion engine 100, 200, for determining a desired fuel setting $\lambda^+$. According to some aspects, the desired fuel setting is a desired fuel setting for an idle mode of the combustion engine 100, 200. According to further aspects, the desired fuel setting is configured to achieve a trade-off between burn-rate and acceleration as discussed above.

The method comprises configuring S1 a fuel setting $\lambda$. The configured fuel setting may be an initial fuel setting retrieved from memory corresponding to a fuel setting used in a prior operation mode of the combustion engine, such as the last engine idle mode. Thus, according to some aspects, the configuring a fuel setting $\lambda$ comprises retrieving S11 the fuel setting from a storage medium of the combustion engine 100, 200. The storage medium may be the storage medium 330 discussed in connection to FIG. 9 above, or it may be some other storage medium suitable for storing the initial fuel setting. In case the method has executed for some time, the configured fuel setting may correspond to an updated fuel setting from a previous execution of the disclosed method. The fuel setting may also be a pre-configured initial fuel setting. Thus, according to some aspects, the disclosed method is an iterative method arranged to iteratively update S12 the fuel setting until a desired fuel setting is obtained.

The method also comprises determining S2 a combustion engine parameter $\beta$ in dependence of the configured fuel setting $\lambda$. The determining may, e.g., comprise receiving an ignition timing value $\alpha$ from the output port 161 illustrated in FIG. 1 and discussed above, or determining the ignition timing value from consecutive voltage pulses V, or determining a revolution speed variance $Var[\omega]$ from the consecutive voltage pulses V as discussed above in connection to FIG. 2.

The combustion engine parameter $\beta$ depends on the fuel setting $\lambda$ through a convex function relationship. A low combustion engine parameter value is indicative of a suitable fuel setting associated with a fast burn-rate. Thus, by varying the fuel setting and monitoring the combustion engine parameter value, a fuel setting corresponding to a low combustion engine parameter value can be selected. This fuel setting is likely to be a suitable fuel setting value which provides for an efficient combustion process. The method therefore comprises updating S4 the fuel setting $\lambda$ based on the determined combustion engine parameter value $\beta$, and on a convex relationship between the fuel setting $\lambda$ and the combustion engine parameter value $\beta$.

According to one example, the combustion engine parameter $\beta$ is an ignition timing value $\alpha$. Thus, there is disclosed herein a method in a combustion engine 100, 200 for determining a desired fuel setting $\lambda^+$. The method comprises configuring a fuel setting $\lambda$, determining an ignition timing value $\alpha$ in dependence of the configured fuel setting $\lambda$, updating S4 the fuel setting $\lambda$ towards the desired fuel setting $\lambda^+$, based on the determined ignition timing value $\alpha$, and on a convex relationship between the fuel setting $\lambda$ and the ignition timing value $\alpha$.

According to another example, the combustion engine parameter $\beta$ is a revolution speed variance $Var[\omega]$. Thus, there is also disclosed herein a method in a combustion engine 100, 200 for determining a desired fuel setting $\lambda^+$. The method comprises configuring a fuel setting $\lambda$, determining a revolution speed variance $Var[\omega]$ in dependence of the configured fuel setting $\lambda$, updating S4 the fuel setting $\lambda$ towards the desired fuel setting $\lambda^+$, based on the determined revolution speed variance $Var[\omega]$, and on a convex relationship between the fuel setting $\lambda$ and the to revolution speed variance $Var[\omega]$.

According to some aspects, fuel setting control is based on a combustion engine parameter $\beta$ that is a vector parameter comprising both ignition timing value $\alpha$ and revolution speed variance $Var[\omega]$.

It is appreciated that the updating can be performed in a number of different ways. For instance, the fuel setting can be swept over a range and the ignition time values monitored. The sweeping of fuel setting may, however, not be possible due to various reasons. Thus, it is disclosed herein more efficient methods of obtaining a desired fuel setting value based on observations of combustion engine parameter value.

One way to obtain the desired fuel setting is to follow a gradient of the combustion engine parameter value towards a lower combustion engine parameter value, since a low combustion engine parameter value is indicative of a suitable fuel setting, or even of an optimal fuel setting. Such gradients 210, 220 were exemplified above in connection to FIG. 3, For instance, starting in a too rich setting $\lambda_1$, a more optimal fuel setting is obtained by updating the fuel setting in a direction corresponding to the gradient 220. Similarly, starting in a too lean setting $\lambda_2$, a more optimal fuel setting is obtained by updating the fuel setting in a direction corresponding to the gradient 210. Consequently, according to some aspects, the determining comprises evaluating S3 a gradient $d/d\lambda$ of the combustion engine parameter value $\beta$ with respect to the fuel setting $\lambda$. The updating then comprises updating S41 the fuel setting $\lambda$ based on the gradient $d/d\lambda$ of the combustion engine parameter value $\beta$.

The operation of evaluating the gradient can be performed in a number of different ways, some of which will now be described in detail.

According to some aspects, evaluating the gradient comprises determining S31 a change in combustion engine parameter value $\beta$ in dependence of configuring the fuel setting $\lambda$. The change in combustion engine parameter is indicative of the gradient direction. I.e., if the combustion engine parameter value increases in dependence of an increased fuel setting, then the gradient is positive in that direction. This way, by evaluating changes in combustion engine parameter value, the fuel setting can be updated in the direction of the desired fuel setting $\lambda^+$. In order to evaluate the change in combustion engine parameter value, an initial combustion engine parameter value prior to the configuring S1 of the fuel setting can be stored in memory.

According to some other aspects, evaluating the gradient comprises determining S32 a sign of a change in combustion engine parameter value $\beta$ in dependence of configuring the fuel setting $\lambda$. The sign of the change in combustion engine parameter value is in some scenarios sufficient in order to update the fuel setting towards the desired fuel setting. For instance, if a given fuel setting configuration corresponded to an increase in fuel setting value, and the associated sign of change in combustion engine parameter was negative, then the fuel setting configuration was made in the correct direction, i.e., in a direction which reduced the combustion engine parameter. In order to evaluate the sign change in combustion engine parameter value, an initial combustion engine parameter value prior to the configuring S1 of the fuel setting can be stored in memory.

With reference to FIG. 3, it is appreciated that the desired fuel setting $\lambda^+$ may not be the same setting as the optimal fuel setting $\lambda^*$ that corresponds to minimum combustion engine parameter value. There are reasons for biasing the optimal fuel setting; Consequently, the desired fuel setting $\lambda^+$ is, according to some aspects, offset or biased 230 from the optimal fuel setting $\lambda^*$. One such reason is that a slightly richer fuel mixture compared to the optimal fuel mixture provides for increased acceleration performance of the engine 100, 200. The bias 230 is a trade-off between maximum burn-rate and acceleration performance. According to some aspects, the acceleration is an acceleration from an idle mode of the engine 100, 200 to a full load operating mode of the engine 100, 200.

To allow for the desired fuel setting to be biased in relation to the optimal fuel setting, evaluating the gradient, according to some aspects, comprises evaluating S33 a modified gradient to bias the desired fuel setting $\lambda^+$ from an optimal fuel setting $\lambda^*$.

One example of the modified gradient comprises biasing or adjusting the difference in combustion engine parameter value between two consecutive determinations of combustion engine parameter value.

Another example of the modified gradient comprises determining a sign of the change in combustion engine parameter value using a non-zero threshold. Thus, a slightly positive combustion engine parameter change is still considered a negative sign change. This way, with reference to FIG. 3, iterations will converge around fuel setting $\lambda^+$ instead of around fuel setting $\lambda^*$.

Yet another example of the modified gradient will be discussed below in connection to using a parameterized model of the relationship between combustion engine parameter and fuel setting.

According to some aspects, the updating comprises updating S42 the fuel setting λ in a direction corresponding to a negative gradient or to a negative modified gradient.

One implementation example of the above described principles comprises increasing the fuel setting λ if the configured fuel setting corresponded to a decreased fuel setting and the determined combustion engine parameter value β was an increased combustion engine parameter value, or if the configured fuel setting corresponded to an increased fuel setting and the determined combustion engine parameter value β was a decreased combustion engine parameter value.

Another implementation example of the above described principles comprises decreasing the fuel setting λ, if the configured fuel setting corresponded to an increased fuel setting and the determined combustion engine parameter value β was an increased combustion engine parameter value, or if the configured fuel setting corresponded to decreased fuel setting and the determined combustion engine parameter value β was a decreased combustion engine parameter value.

According to aspects, to allow for biasing 230 of the desired fuel setting compared to the optimal fuel setting, an increase or decrease in combustion engine parameter value is determined after an adjustment term has been added to the determined combustion engine parameter value β, thereby biasing the desired fuel setting $\lambda^+$ from the optimal fuel setting $\lambda^*$. The adjustment term can be adapted or pre-configured.

A more advanced way of controlling the update of fuel setting is to estimate the actual convex relationship between fuel setting and combustion engine parameter, i.e., the convex curve shape illustrated in FIG. 3. This curve can be parameterized in different ways, and the model parameters estimated. The model can then be used to analytically derive, e.g., the gradient for a given fuel setting, or even the desired fuel setting directly in one calculation.

An example of such a parameterized model is a second order curve, a polynomial, given by $\beta = a + b\lambda + c\lambda^2$, where a, b, and c are model parameters.

Another example of such a parameterized model is a second order curve which includes the above discussed biasing from optimal fuel setting 230. This model is given by $\beta = a + b(\lambda+d) + c(\lambda+d)^2$, where a, b, c and the bias d are the model parameters.

The model parameters may be estimated on-line or determined a-priori from laboratory experiments.

Consequently, according to some aspects, evaluating the gradient $d/d\lambda$ of the combustion engine parameter value β comprises estimating S34 model parameters of a model describing a convex relationship between the combustion engine parameter value β and the fuel setting λ, and determining the gradient based on the model and on the model parameters.

According to aspects, the convex relationship between the combustion engine parameter value β and the fuel setting λ is given by $\beta = a + b\lambda + c\lambda^2$, where a, b, and c are the model parameters, and where the gradient is determined as $d/d\lambda\, \beta = b + 2c\lambda$.

According to other aspects, the convex relationship between the combustion engine parameter value β and the fuel setting λ is given by $\beta = a + b(\lambda+d) + c(\lambda+d)^2$, where a, b, c and d are the model parameters, and where the gradient is determined as $d/d\lambda\, \beta = b + 2c\lambda + 2cd$.

On-line determination of the model parameters can be performed using a wide variety of known methods. For instance, the estimating of model parameters comprises applying any of Recursive Least Squares, RLS, Least Mean Squares, LMS, a Kalman filter, an Extended Kalman filter, a Wiener filter, or a particle filter.

According to some aspects, configuring a fuel setting λ comprises alternating S13 between a high 630 and a low 640 fuel setting. The high fuel setting corresponds to a nominal fuel setting 650 with a positive bias. The low fuel setting corresponding to the nominal fuel setting 650 with a negative bias. This alternating was discussed above in connection to FIG. 6. The alternating is especially advantageous when it is difficult to detect changes in the combustion engine parameter when the fuel setting is changed.

According to some aspects, the updating comprises decreasing the nominal fuel setting if the low fuel setting corresponded to a reduced combustion engine parameter compared to the high fuel setting, and increasing the nominal fuel setting if the high fuel setting corresponded to a reduced combustion engine parameter compared to the low fuel setting Once the fuel setting has been updated, the control unit 160 may store the updated fuel setting in a storage medium, such as storage medium 330 illustrated in FIG. 4.

The invention claimed is:

1. A method in a combustion engine for determining a desired fuel setting, the method comprising;
    configuring a fuel setting;
    determining a combustion engine parameter in dependence of the configured fuel setting, wherein the combustion engine parameter is associated with an ignition timing value of the combustion engine; and
    updating the fuel setting towards the desired fuel setting, based on the determined combustion engine parameter and on a convex function relationship between the fuel setting and the combustion engine parameter.

2. The method according to claim 1, wherein the desired fuel setting is a desired fuel setting for an idle mode of the combustion engine.

3. The method according to claim 1, wherein the determining comprises evaluating a gradient of the combustion engine parameter with respect to the fuel setting, wherein the updating comprises updating the fuel setting based on the gradient of the combustion engine parameter.

4. The method according to claim 3, wherein evaluating the gradient comprises determining a change in combustion engine parameter in dependence of configuring the fuel setting.

5. The method according to claim 3, wherein evaluating the gradient comprises determining a sign of a change in combustion engine parameter in dependence of configuring the fuel setting.

6. The method according to claim 3, wherein evaluating the gradient comprises evaluating a modified gradient to bias the desired fuel setting from an optimal fuel setting.

7. The method according to claim 3, wherein the updating comprises updating the fuel setting in a direction corresponding to a negative gradient or to a negative modified gradient.

8. The method according to claim 7, wherein the updating comprises increasing the fuel setting, if the configured fuel setting corresponded to a decreased fuel setting and the determined combustion engine parameter was an increased combustion engine parameter, or if the configured fuel setting corresponded to an increased fuel setting and the determined combustion engine parameter was a decreased combustion engine parameter.

9. The method according to claim 7, wherein the updating comprises decreasing the fuel setting, if the configured fuel setting corresponded to an increased fuel setting and the determined combustion engine parameter was an increased combustion engine parameter, or if the configured fuel setting corresponded to decreased fuel setting and the determined combustion engine parameter was a decreased combustion engine parameter.

10. The method according to any of claim 8, wherein an increase or decrease in combustion engine parameter is determined after an adjustment term has been added to the determined combustion engine parameter, thereby biasing the desired fuel setting from the optimal fuel setting.

11. The method according to claim 3, wherein evaluating the gradient of the combustion engine parameter comprises estimating model parameters of a model describing a convex relationship between the combustion engine parameter and the fuel setting, and determining the gradient based on the model and on the model parameters.

12. The method according to claim 11, wherein the estimating model parameters comprises applying any of Recursive Least Squares, RLS, Least Mean Squares, LMS, a Kalman filter, an Extended Kalman filter, a Wiener filter, or a particle filter to estimate the model parameters.

13. The method according to claim 11, where the convex relationship between the combustion engine parameter ($\beta$) and the fuel setting ($\lambda$) is given by:

$\beta = a + b\lambda + c\lambda$, where a, b, and c are the model parameters, and where the gradient is determined as $d/d\lambda\ \beta = b + 2c\lambda$, or $\beta = a + b(\lambda+d) + c(\lambda+d)^2$, where a, b, c and d are the model parameters, and where the gradient is determined as $d/d\lambda\beta = b + 2c\lambda + 2cd$.

14. The method according to claim 1, wherein configuring a fuel setting comprises retrieving the fuel setting from a storage medium of the combustion engine.

15. The method according to claim 1, wherein configuring a fuel setting comprises alternating between a high and a low fuel setting, the high fuel setting corresponding to a configured fuel setting with a positive bias, the low fuel setting corresponding to the configured fuel setting with a negative bias.

16. The method according to claim 15, wherein the updating comprises decreasing the configured fuel setting if the low fuel setting corresponded to a reduced combustion engine parameter compared to the high fuel setting, and increasing the configured fuel setting if the high fuel setting corresponded to a reduced combustion engine parameter compared to the low fuel setting, and wherein the method further comprises storing the updated fuel setting in a storage medium.

17. The method according to claim 1, wherein the combustion engine parameter is an ignition timing value of the combustion engine.

18. The method according to claim 1, wherein the combustion engine parameter is a revolution speed variance of the combustion engine,
wherein the combustion engine parameter is a vector parameter comprising an ignition timing value and the revolution speed variance of the combustion engine.

19. A control unit for a combustion engine, wherein the combustion engine is arranged to output an ignition timing value on an output port and to receive a fuel setting on an input port, the control unit comprising processing circuitry and an interface module, wherein the processing circuitry is arranged to:

configure the fuel setting and to output the fuel setting to the input port;

determine a combustion engine parameter in dependence of the configured fuel setting, wherein the combustion engine parameter is associated with the ignition timing value of the combustion engine; and update the fuel setting towards a desired fuel setting, based on the determined combustion engine parameter and on a convex function relationship between the fuel setting and the combustion engine parameter.

20. A combustion engine or a power tool comprising the control unit according to claim 19.

* * * * *

UNITED STATES PATENT AND TRADEMARK OFFICE
CERTIFICATE OF CORRECTION

PATENT NO. : 11,268,470 B2
APPLICATION NO. : 17/052663
DATED : March 8, 2022
INVENTOR(S) : Johan Ikonen It is certified that error appears in the above-identified patent and that said Letters Patent is hereby corrected as shown below:

In the Claims

In Column 13, Line 7, in Claim 10, "The method according to any of claim 8, wherein an" should read --The method according to claim 8, wherein an--.

In Column 13, Line 26, in Claim 13, "$\beta=a+b\lambda+c\lambda$, where a, b, and c are the model parameters," should read --$\beta=a+b\lambda+c\lambda^2$, where a, b, and c are the model parameters,--.

Signed and Sealed this
Sixteenth Day of August, 2022

Katherine Kelly Vidal
*Director of the United States Patent and Trademark Office*